United States Patent [19]

Ervin et al.

[11] 3,896,849

[45] July 29, 1975

[54] PRESSURE RELIEF VALVE

[75] Inventors: Paul R. Ervin, Milford; George H. Muller, Ann Arbor, both of Mich.

[73] Assignee: Ford Motor Company, Dearborn, Mich.

[22] Filed: Aug. 5, 1974

[21] Appl. No.: 494,654

Related U.S. Application Data

[60] Continuation of Ser. No. 385,921, Aug. 6, 1973, abandoned, which is a division of Ser. No. 234,227, Feb. 13, 1972, abandoned.

[52] U.S. Cl. ........................ 137/525.1; 137/525.1
[51] Int. Cl.[2] ............................................ F16K 15/14
[58] Field of Search ........ 137/525, 525.1, 223; 16/2; 251/145; 239/267, 542, 602; 285/158; 29/235

[56] References Cited
UNITED STATES PATENTS

| | | | |
|---|---|---|---|
| 2,064,695 | 12/1936 | Sipe | 137/525.1 |
| 2,456,355 | 12/1948 | Aber | 16/2 |
| 3,148,696 | 9/1964 | Hoke | 137/525.1 X |
| 3,159,176 | 12/1964 | Russell et al. | 137/525.1 X |
| 3,361,363 | 1/1968 | Babington | 137/223 X |
| 3,572,379 | 3/1971 | Popa et al. | 137/525.1 |

*Primary Examiner*—William R. Cline
*Attorney, Agent, or Firm*—Roger E. Erickson; Keith L. Zerschling

[57] ABSTRACT

A pressure relief valve suitable for use with a pneumatic resilient automotive bumper. The valve includes an elastomeric insert that is positioned in a wall of the pneumatic enclosure and has a pair of closed lips which separate to release fluid under pressures exceeding a certain magnitude. A resilient ring or elastic garter surrounds a portion of the elastomeric insert adjacent the lips and exerts an additional closing force on the lips of the insert. Rings of various sizes, elasticities or spring rates may be utilized to vary the pressures at which the closure members or lips of the valve open.

2 Claims, 4 Drawing Figures

PATENTED JUL 29 1975  3,896,849
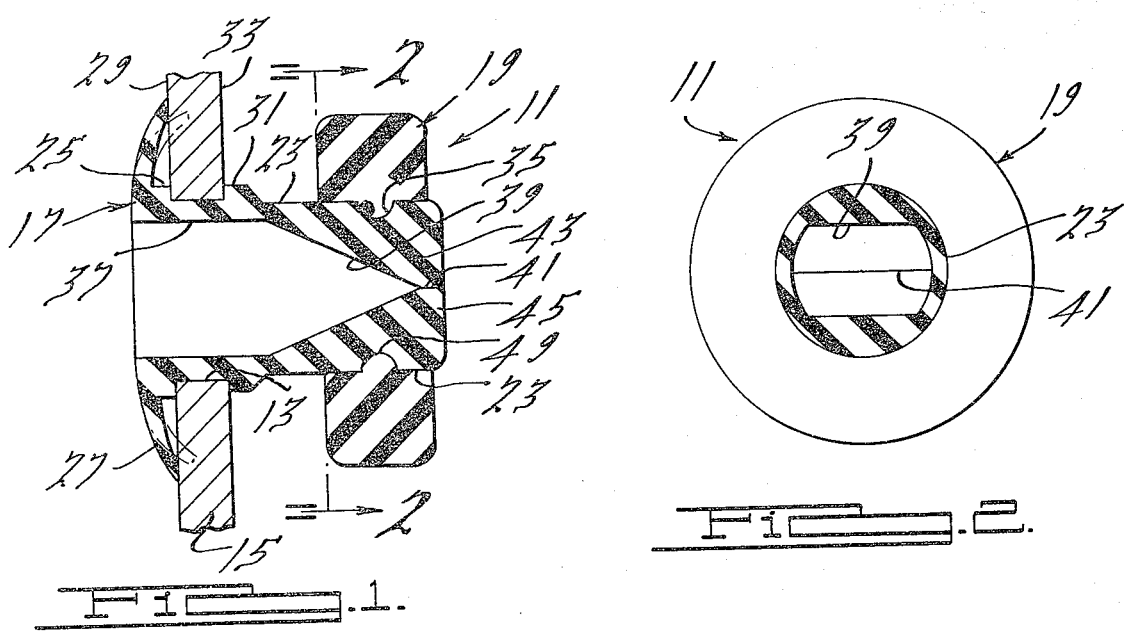
Fig. 1.
Fig. 2.
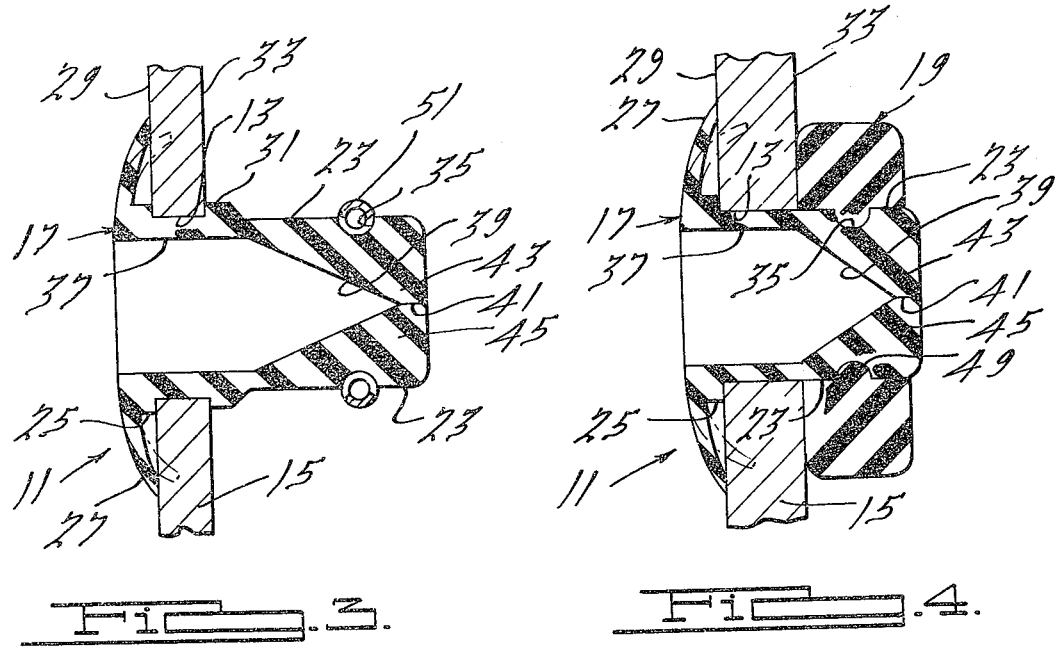
Fig. 3.
Fig. 4.

PRESSURE RELIEF VALVE

This is a continuation of application Ser. No. 385,921, now abandoned filed Aug. 6, 1973, which, in turn, is a division of the parent application Ser. No. 234,227, filed Feb. 13, 1972, now abandoned.

BACKGROUND AND SUMMARY OF THE INVENTION

The rebound and energy dissipation characteristics of pneumatic resilient bumpers for automotive vehicles can be improved by providing pressure release valves that prevent excessive buildup of pressure within the pneumatic bumper enclosures.

This invention provides a pressure release valve which is suitable for use in a pneumatic resilient bumper as well as in other applications requiring the limitation of maximum fluid pressures. The invention provides a particularly reliable construction, one which may be entirely fabricated of corrosion free non-metallic materials. Furthermore, the invention provides a valve which opens without the necessity of overcoming any frictional forces rising out of relative movement between valve elements and which is unaffected by and can be exposed to road dirt.

The invention also provides a pressure release valve having a simple two-piece construction giving rise to substantial manufacturing economies. The construction further provides ease of installation into the bumper wall. More particularly, installation is effected by two snap-in-place operations and requires no threaded fasteners.

Finally, the invention provides a construction in which the opening or release pressure of the valve may be varied by changing of one of the two components of the valve assembly without necessitating the entire replacement or removal of the valve apparatus.

A pressure release valve constructed in accordance with this invention includes an elastomeric insert positioned within an opening in the wall of the pneumatic bumper enclosure. The insert includes a passage extending from the interior of the pneumatic enclosure toward the exterior of the enclosure. The insert also includes member or lips separating the passage from the exterior of the pneumatic bumper enclosure when the enclosure contains a fluid of a pressure less than a predetermined magnitude. The closure means are elastically deformable to open the passage to the exterior of the enclosure when the pressure within the pneumatic enclosure exceeds the predetermined magnitude. A resilient ring or garter is positioned about the insert and constricts the closure members to a more tightly closed position. The magnitude of the pressure upon which the valve opens may be varied by substituting resilient rings or garters having different sizes, elasticities or spring rates.

BRIEF DESCRIPTION OF THE DRAWINGS

FIG. 1 is a cross sectional view of a pressure release valve constructed in accordance with the invention.

FIG. 2 of the drawings is a sectional view taken along line 2—2 of FIG. 1.

FIG. 3 is a cross sectional view of a modified form of the invention.

FIG. 4 of the drawings is a cross sectional view of still another modified or alternate embodiment of the invention.

DETAILED DESCRIPTION OF THE PREFERRED EMBODIMENTS

FIG. 1 of the drawings illustrates a pressure release valve assembly 11 positioned within an opening 13 of a wall 15 of a pneumatic enclosure (not shown). The valve assembly includes two components: the first being an insert 17 which is received within opening 13, and the second being an elastomeric annulus or ring 19 which is positioned about a portion 21 of the insert protruding from the pneumatic enclosure.

The insert 17 has cylindrical outer surfaces 23 of radii essentially equal to or slightly less than the radius of opening 13 in the pneumatic enclosure wall. A radially enlarged head portion 25 including an annular flange 27 is received within the pneumatic enclosure and engages the interior 29 of the enclosure wall adjacent the opening 13. The flange 27 is relatively thin and flexible and molded to a form as shown by the broken lines in FIG. 1. It is deformed when installed within opening 15 and maintains a resilient engagement with the inside of wall 15 to maintain an effective seal therewith. An increase in pressure within the pneumatic enclosure also increases the sealing effectiveness of the flange 27.

A second flange or abutment 31 engages the exterior surface 33 of the pneumatic enclosure wall and acts to retain the insert 17 in position within the opening 13. The second flange or abutment is deformable to permit the insert to be forced through the opening while the insert is being positioned within the enclosure wall. Finally, a circumferential groove 35 is formed in the portion of the insert which protrudes from the pneumatic enclosure. The axis of the insert is directed substantially perpendicular to the pneumatic enclosure wall 15.

The insert 17 is formed with a passageway 37 having a circular cross section opening to the pneumatic enclosure. The opposite end portion 39 of the passageway has a continually decreasing cross sectional area terminating at a knife slit 41 which separates an upper closure means or lip 43 from a lower closure means or lip 45.

An elastomeric annulus or ring 19 having a diameter slightly less than the cylindrical surfaces 23 of the insert 17 is positioned about the protruding portion 21 of the insert as shown in FIG. 1. The elastomeric ring 19 needs to be stretched slightly in order to be positioned about the insert. In position about the insert the ring provides a constricting force increasing the closing pressure of lips 43 and 45. A bead 49, extending radially inwardly from the inner surface of the ring 19, is receivable within the groove of the insert to maintain the axial position of the ring about the insert.

When the pressure within the pneumatic enclosure exceeds a certain magnitude, the resilient forces urging the closure means or lips 43 and 45 toward closed positions are overcome and the lips separate to release pressure.

The release or "blow-off" pressure of the valve assembly 11 may be varied by substituting rings 19 of different rates of elastic deformation or of different cross sectional dimensions.

FIG. 3 of the drawing shows a modified form of the invention similar to that shown in FIG. 1, but using a metal spring garter 51 about the insert 17 within groove 35 rather than an elastomeric ring. Once again, variation or tuning of the blow-off pressure of the valve assembly may be achieved by varying the spring rate and tensile load within the garter 51 when in position about the insert.

FIG. 4 of the drawings illustrates an additional modification of the invention in which the elastomeric ring or annulus 19 is used to retain the insert within the opening of the pneumatic enclosure wall as well as to constrict the end portion adjacent the closure members 43 and 45. In this embodiment, the annular ring 19 engages the outer surfaces 33 of the pneumatic enclosure wall and together with head 25 of the insert 17.

Elements of the embodiments of FIGS. 3 and 4 analogous to elements identified in the description of the embodiments of FIG. 1 are identified by the same reference numerals.

It should be understood that each of the valve embodiments may be used with liquids as well as gases.

Modifications and alterations may occur to those skilled in the art which are included in the scope of the following claims.

We claim:

1. The combination of an elastomeric pressure relief valve and a relatively rigid fluid enclosure wall, said enclosure wall having a circular opening formed therein, said valve including an elastomeric insert received within said opening, said insert including a passage extending from the interior of said enclosure toward the exterior thereof and closure means separating said passage from the exterior of said enclosure when the enclosure contains a fluid of a pressure less than a predetermined magnitude, said closure means being elastically deformable to open said passage to the exterior of said enclosure when the pressure within the enclosue exceeds the predetermined magnitude, said insert including a head having a cross sectional dimension greater than that of the opening in the wall of said enclosure, resilient means positioned about said insert constricting said closure means to a more tightly closed position, said resilient means comprising an elastomeric annulus, said insert and said resilient means including annular groove means and cooperating annular bead means to retain said resilient means in a predetermined position about said insert, said elastomeric annulus when in position about said insert being engaged with the exterior of the enclosure wall adjacent said opening, said insert head and said elastomeric annulus sandwiching the enclosure wall to retain said insert in position within said opening.

2. The combination of a pressure relief valve and a fluid enclosure wall, said enclosure wall having a circular opening formed therein, said valve including an elastomeric insert positionable within an opening, said insert including a passage extending from the interior of said enclosure toward the exterior thereof and closure means separating said passage from the exterior of said enclosure when the enclosure contains a fluid of a pressure less than a predetermined magnitude, said closure means being elastically deformable to open said passage to the exterior of said enclosure when the pressure within the enclosure exceeds the predetermined magnitude, said insert including a head having a cross sectional dimension greater than that of the opening in the wall of said enclosure, resilient means positionable about said insert constricting said closure means to a more tightly closed position, said insert having a generally cylindrical outer surface in which the axis of symmetry is substantially perpendicular to the wall of said enclosure adjacent said opening, a portion of said insert protruding from said enclosure, an annular groove formed in said protruding portion of said insert, said resilient means comprising an elastomeric annulus including a bead portion received within said groove to retain said annulus in a predetermined position about said insert, said resilient means being in tension when in position about the protruding portion of said insert, said elastomeric annulus when said bead portion is received within said groove being engaged with the exterior of the enclosure wall adjacent said opening and together with said insert head sandwiching the enclosure wall to retain said insert in position within said opening.

* * * * *